US011927970B2

(12) United States Patent
El Assaad et al.

(10) Patent No.: US 11,927,970 B2
(45) Date of Patent: Mar. 12, 2024

(54) CONTROL CENTER, VEHICLE, METHOD, DEVICE AND COMPUTER PROGRAM FOR TAKING CONTROL OF A VEHICLE TO BE CONTROLLED

(71) Applicant: VOLKSWAGEN AKTIENGESELLSCHAFT, Wolfsburg (DE)

(72) Inventors: Ahmad El Assaad, Wolfsburg (DE); Andreas Kwoczek, Lehre (DE); Julia Kwasny, Wolfsburg (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 5 days.

(21) Appl. No.: 17/344,197

(22) Filed: Jun. 10, 2021

(65) Prior Publication Data
US 2021/0389781 A1 Dec. 16, 2021

(30) Foreign Application Priority Data
Jun. 10, 2020 (DE) .................... 10 2020 207 283.3

(51) Int. Cl.
*G05D 1/02* (2020.01)
*G05D 1/00* (2006.01)
(Continued)

(52) U.S. Cl.
CPC ......... *G05D 1/0295* (2013.01); *G05D 1/0276* (2013.01); *G08G 1/096725* (2013.01)

(58) Field of Classification Search
CPC ............... G05D 1/0295; G05D 1/0276; G05D 2201/0213; G05D 1/0293;
(Continued)

(56) References Cited

U.S. PATENT DOCUMENTS 9,165,470 B2 10/2015 Mudalige et al.
10,073,464 B2 9/2018 Pilkington
(Continued)

FOREIGN PATENT DOCUMENTS

CN 102901510 A 1/2013
CN 106708057 A 5/2017
(Continued)

OTHER PUBLICATIONS

Office Action; Chinese Patent Application No. 202110647191.0; dated Aug. 15, 2022.
(Continued)

*Primary Examiner* — Rodney A Butler
(74) *Attorney, Agent, or Firm* — Barnes & Thornburg LLP

(57) ABSTRACT

A method for a leading transportation vehicle and for taking over control of a transportation vehicle to be controlled, including identifying the transportation vehicle to be controlled; determining a dynamic holding area relative to the leading transportation vehicle for the transportation vehicle to be controlled, wherein the dynamic holding area is defined so that the transportation vehicle to be controlled remains behind the leading transportation vehicle and uses a different lane; and transmitting a message relating to the dynamic holding area to the transportation vehicle to be controlled.

20 Claims, 3 Drawing Sheets

(51) Int. Cl.
*G08G 1/09* (2006.01)
*G08G 1/0967* (2006.01)

(58) Field of Classification Search
CPC .. G08G 1/096725; G08G 1/017; G08G 1/202;
G08G 1/207; G08G 1/096791; B60W
30/16; B60W 40/04; B60W 60/0017;
B60W 2300/16; B60W 2554/4042
See application file for complete search history.

(56) References Cited

U.S. PATENT DOCUMENTS

| | | | |
|---|---|---|---|
| 10,684,352 B2 | 6/2020 | El Assaad | |
| 10,825,344 B2 | 11/2020 | Belapurkar et al. | |
| 11,189,176 B2 | 11/2021 | Rech et al. | |
| 2006/0250272 A1 | 11/2006 | Puamau | |
| 2013/0030606 A1 | 1/2013 | Mudalige et al. | |
| 2014/0368601 A1* | 12/2014 | deCharms | H04N 7/148 348/14.02 |
| 2018/0267558 A1* | 9/2018 | Tiwari | H04N 13/243 |
| 2019/0088133 A1 | 3/2019 | Alieiev et al. | |
| 2019/0179334 A1 | 6/2019 | Kim | |
| 2019/0250639 A1 | 8/2019 | Xu et al. | |
| 2019/0279227 A1* | 9/2019 | Chantz | G06Q 30/018 |
| 2019/0377336 A1* | 12/2019 | Avery | G05D 1/021 |
| 2019/0392715 A1 | 12/2019 | Strauss et al. | |
| 2020/0057453 A1* | 2/2020 | Laws | B60W 10/04 |
| 2020/0073408 A1 | 3/2020 | Kim et al. | |
| 2020/0151971 A1* | 5/2020 | Ogawa | G06Q 50/30 |
| 2020/0193811 A1* | 6/2020 | Zagajac | G08G 1/161 |
| 2022/0076565 A1* | 3/2022 | Bartkowiak | G08G 1/0133 |

FOREIGN PATENT DOCUMENTS

| | | |
|---|---|---|
| CN | 108834434 A | 11/2018 |
| CN | 109501801 A | 3/2019 |
| CN | 109901144 A | 6/2019 |
| CN | 110036423 A | 7/2019 |
| CN | 110164122 A | 8/2019 |
| CN | 110192230 A | 8/2019 |
| DE | 102016002127 A1 | 9/2016 |
| DE | 102015225729 A1 | 6/2017 |
| DE | 102018110570 A1 | 9/2018 |
| DE | 102019101790 A1 | 8/2019 |
| DE | 102018114808 A1 | 12/2019 |
| EP | 3423326 A1 | 1/2019 |
| JP | 2009146204 A | 7/2009 |
| SE | 1550271 A1 | 10/2016 |
| WO | 2018111177 A1 | 6/2018 |
| WO | 2020014090 A1 | 1/2020 |

OTHER PUBLICATIONS

Office Action; Chinese Patent Application No. 202110647191.0; dated Feb. 15, 2023.

* cited by examiner

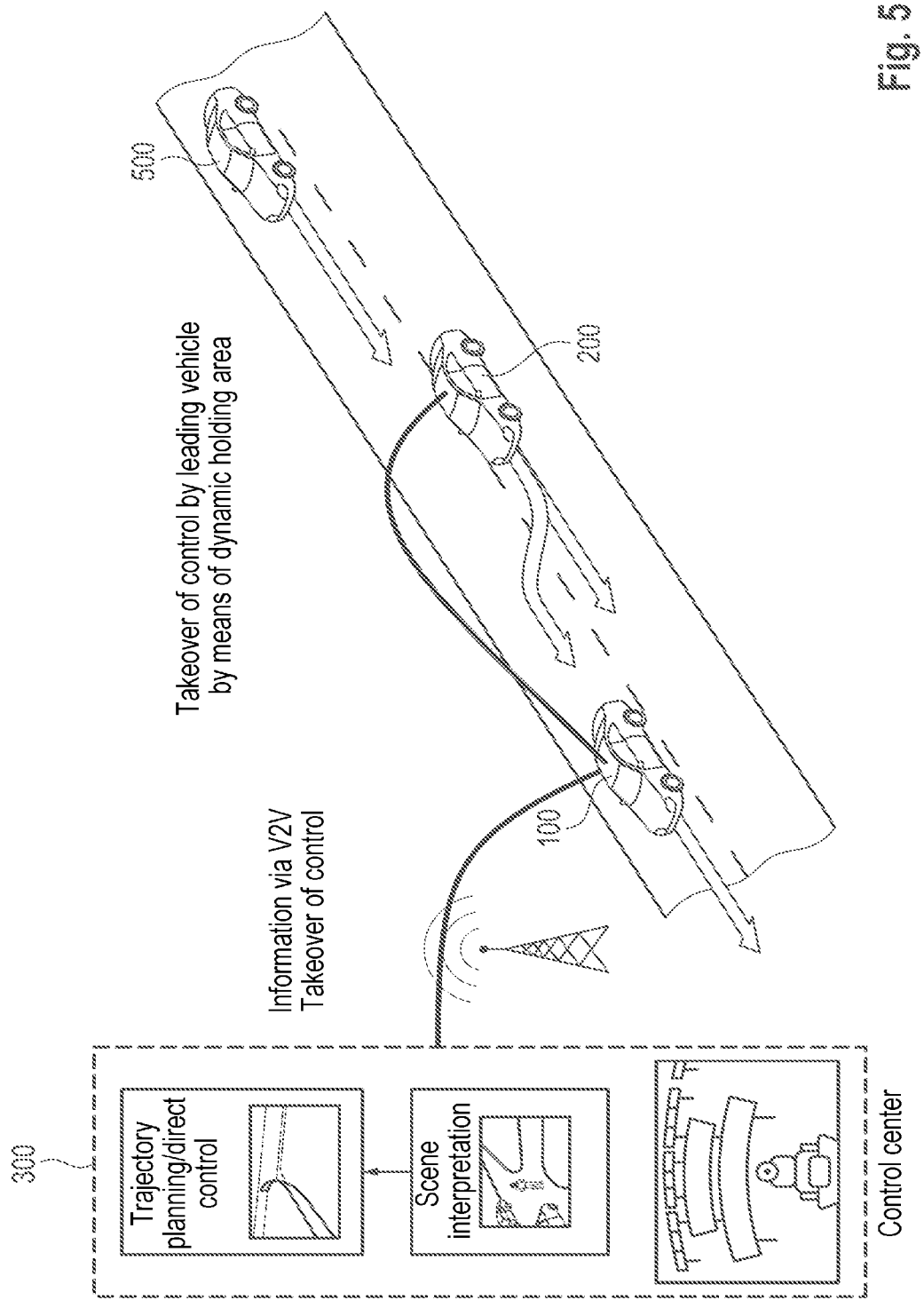

CONTROL CENTER, VEHICLE, METHOD, DEVICE AND COMPUTER PROGRAM FOR TAKING CONTROL OF A VEHICLE TO BE CONTROLLED

PRIORITY CLAIM

This patent application claims priority to German Patent Application No. 10 2020 207 283.3, filed 10 Jun. 2020, the disclosure of which is incorporated herein by reference in its entirety.

SUMMARY

Illustrative embodiments relate to a method, a computer program, a transportation vehicle, a control center and an apparatus for coordinating a takeover of control of a transportation vehicle to be controlled, in particular, but not exclusively, to a concept for taking over control of a transportation vehicle by keeping the transportation vehicle to be controlled in a dynamic holding area relative to a leading or controlling transportation vehicle.

BRIEF DESCRIPTION OF THE DRAWINGS

Disclosed embodiments are described in more detail below based on the drawings, in which:

FIG. 5 shows a scenario of a takeover of control in an exemplary embodiment.

DETAILED DESCRIPTION

Figure 1:
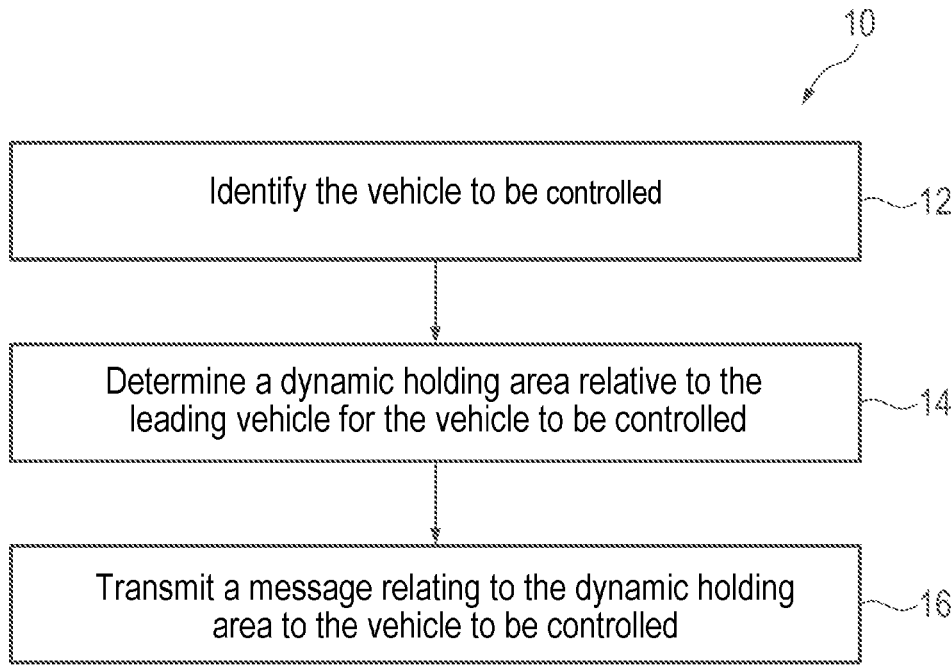
FIG. 1 shows a block diagram of a flowchart of an exemplary embodiment of a method for a leading transportation vehicle and taking over control of a transportation vehicle to be controlled.

It is foreseeable that there will be more and more autonomously driving transportation vehicles in the road traffic in future. Autonomously driving transportation vehicles can be en route entirely without a driver who could drive the transportation vehicle out of certain areas if instructed by the police, fire department etc. Towing services are also not always available and are laborious and expensive. In addition, there are situations in which certain areas must be cleared, for example, in the case of state visits, for events etc. Even in extreme situations, such as when criminals are identified in an autonomous transportation vehicle, the autonomous transportation vehicle must be able to be guided by an (autonomous) police vehicle to the next examination station. Even if transportation vehicles are intended to be removed from the flowing traffic within the scope of official tasks, possible ways of doing this must be provided.

The document DE 10 2015 225 729 A1 relates to a method for identifying an autonomous transportation vehicle, in which a unit transmits a query relating to the transportation vehicle to a trust center, wherein the query comprises an identification of the transportation vehicle and an identification of the unit, and the unit receives an approval request after the identifications have been checked by the trust center.

The document DE 10 2018 110 570 A1 describes a method for transmitting an instruction from a specification authority to a target transportation vehicle in a targeted manner, wherein a transmission is effected by transmitting an electronic broadcast message by a transmitting unit of the specification authority and receiving the electronic broadcast message by receiving units of transportation vehicles in the environment of the specification authority.

The document DE 10 2019 101 790 A1 teaches a system and a method for forming a fleet and for positioning transportation vehicles in the fleet.

The document DE 10 2016 002 127 A1 teaches a transportation vehicle for inclusion in a transportation vehicle combination, in which the relative lateral transportation vehicle positions can be adjusted, and a corresponding method.

It is apparent with these concepts that rigid specifications are made for taking over control; for example, a fixed trajectory or a defined destination is specified to a transportation vehicle. However, this may be unfavorable on account of the dynamics of traffic events, for example, if the traffic density along the trajectory changes or unforeseeable events such as accidents occur.

Therefore, there is a need to provide an improved concept for taking over control of a transportation vehicle to be controlled. The subjects of the appended independent claims take this need into account.

Exemplary embodiments are based on the core idea that a holding area relative to a leading transportation vehicle can be assigned to a transportation vehicle to be controlled for taking over control. The transportation vehicle to be controlled can then move autonomously within the holding area, for example, can carry out braking and steering maneuvers, and can also leave the holding area in exceptional situations or emergencies. This has the benefit that there is not yet a need to make a rigid specification with respect to the further course of the journey at the time of taking over control; for example, a rigid trajectory or a target position need not yet be communicated at the time of taking over control, but rather is revealed only over the course of the controlled journey.

Exemplary embodiments provide a method for a leading transportation vehicle and for taking over control of a transportation vehicle to be controlled. The method comprises identifying the transportation vehicle to be controlled, and determining a dynamic holding area relative to the leading transportation vehicle for the transportation vehicle to be controlled. The method also comprises transmitting a message relating to the dynamic holding area to the transportation vehicle to be controlled. The transportation vehicle to be controlled can be accordingly controlled via the dynamic holding area.

The dynamic holding area may comprise, for example, a corridor behind the leading transportation vehicle for the transportation vehicle to be controlled. The corridor makes it possible to specify a clearance for the controlled transportation vehicle, within which the transportation vehicle can adapt to current traffic events.

In further exemplary embodiments, the method can also comprise transmitting an item of information relating to the takeover of control to a control center and receiving a confirmation of the takeover of control from the control center. The communication via a control center and the confirmation by the control center may contribute to a safer takeover of control. Unauthorized takeovers of control can be prevented.

The dynamic holding area can depend on the speed of the leading transportation vehicle and a traffic situation. In exemplary embodiments, traffic safety and a safe flow of traffic can thus be ensured.

In addition, in some exemplary embodiments, the takeover of control may also be documented in the leading transportation vehicle. Exemplary embodiments can, therefore, make it possible to track and check takeovers of control.

Exemplary embodiments also provide a method for a transportation vehicle to be controlled and for taking over control by a leading transportation vehicle. The method comprises receiving a message relating to a dynamic holding area from the leading transportation vehicle, and controlling the transportation vehicle to be controlled to remain in the dynamic holding area relative to the leading transportation vehicle. Exemplary embodiments can therefore enable a takeover of control in line with the traffic.

In some exemplary embodiments, the method may also comprise receiving an authorization from a control center relating to the takeover of control before controlling the transportation vehicle to be controlled. Unauthorized takeovers of control can therefore be reduced or avoided.

The operation of controlling the transportation vehicle to be controlled to remain in the dynamic holding area relative to the leading transportation vehicle can also be carried out on the basis of received traffic information. A particular traffic situation, for example, an accident or a risky maneuver by another road user, can cause control from the holding area. Safety in the traffic flow can therefore be maintained despite the takeover of control.

The method may also comprise taking over control of a transportation vehicle following the transportation vehicle to be controlled. Combinations or chains of transportation vehicles can therefore be formed at least in some exemplary embodiments.

In some exemplary embodiments, the takeover of control can also be documented in the transportation vehicle to be controlled. Exemplary embodiments can therefore make it possible to track and check takeovers of control.

Exemplary embodiments also provide a method for a control center for monitoring a takeover of control of a transportation vehicle to be controlled by a leading transportation vehicle. The method comprises receiving a message relating to a dynamic holding area from the leading transportation vehicle, and verifying an authorization of the leading transportation vehicle. The method also comprises transmitting an authorization to take over control to the transportation vehicle to be controlled. Unauthorized takeovers of control by transportation vehicles can therefore be reduced or avoided.

In some exemplary embodiments, the takeover of control can be documented by the control center. Exemplary embodiments can therefore make it possible to track and check takeovers of control.

A further exemplary embodiment is a computer program for carrying out a method described herein when the program code runs on a computer, a processor, a control module or a programmable hardware component.

An apparatus for taking over, monitoring or coordinating a takeover of control of a transportation vehicle to be controlled by a leading transportation vehicle is a further exemplary embodiment. The apparatus comprises at least one interface for communication, and a control module for carrying out one of the methods described herein. Further exemplary embodiments are a transportation vehicle or a control center having such an apparatus.

Various exemplary embodiments are now described in more detail with reference to the accompanying drawings which illustrate some exemplary embodiments. Optional features or components are illustrated using dashed lines in this case.

Although exemplary embodiments can be modified and altered in various ways, exemplary embodiments are illustrated in the figures as examples and are described in detail herein. However, it should be clarified that there is no intention to restrict exemplary embodiments to the respectively disclosed forms, but rather exemplary embodiments are intended to cover all functional and/or structural modifications, equivalents and alternatives within the scope of the disclosure.

It should be noted that an element which is referred to as being "connected" or "coupled" to another element can be directly connected or coupled to the other element or elements may be present in between. In contrast, if an element is referred to as being "directly connected" or "directly coupled" to another element, there are no elements present in between. Other terms which are used to describe the relationship between elements should be interpreted in a similar manner (for example, "between" in comparison with "directly in between", "adjacent" in comparison with "directly adjacent" etc.).

The terminology used herein serves only to describe particular exemplary embodiments and is not intended to restrict the exemplary embodiments. As used herein, the singular forms "a(n)" and "the" are also intended to include the plural forms, unless clearly indicated otherwise by the context. Furthermore, it should be clarified that the expressions such as "contains", "containing", "has", "comprises", "comprising" and/or "having", as used herein, indicate the presence of stated features, whole numbers, work sequences, elements and/or components, but do not rule out the presence or the addition of one or more features, whole numbers, work sequences, elements, components and/or groups thereof.

FIG. 1 shows a block diagram of a flowchart of an exemplary embodiment of a method 10 for a leading transportation vehicle and for taking over control of a transportation vehicle to be controlled. The method 10 comprises identifying 12 the transportation vehicle to be controlled and determining 14 a dynamic holding area relative to the leading transportation vehicle for the transportation vehicle to be controlled. The method 10 also comprises transmitting 16 a message relating to the dynamic holding area to the transportation vehicle to be controlled.

In this case, the transportation vehicles may be any transportation vehicles, for example, automobiles, trucks, transport vehicles, etc. The leading transportation vehicle may be, for example, an official transportation vehicle such as a police car, but a transportation vehicle wishing to form a convoy, a combination, a transportation vehicle chain or a platoon with other transportation vehicles is also conceivable. In this case, the transportation vehicle to be controlled may be any desired other road user, for example, under the control of a human driver (directly or by teleoperation) or autonomously driving, for example, even entirely without a driver. The transportation vehicle to be controlled is designed to receive the message, that is to say there are appropriate components for receiving messages. The dynamic holding area is an area which is defined relative to the leading transportation vehicle, for example, an area behind the transportation vehicle. This area can therefore dynamically migrate together with the leading transportation vehicle. In addition, this area can also change its size and shape, for example, to enable the controlled transportation vehicle to comply with an appropriate safety distance or to use a different lane. The dynamic holding area therefore allows the controlled transportation vehicle a certain degree of freedom, but nevertheless keeps it under the control of the leading transportation vehicle. For example, the dynamic holding area forms a corridor behind the leading transportation vehicle for the transportation vehicle to be controlled. In this case, the dynamic holding area may depend on the speed of the leading transportation vehicle and the traffic situation. The identification 12 of the transportation vehicle to be controlled may comprise in this case determining an identifier, for example, on the basis of a license plate number or a radio identifier, of the transportation vehicle to be controlled.

Figure 2:
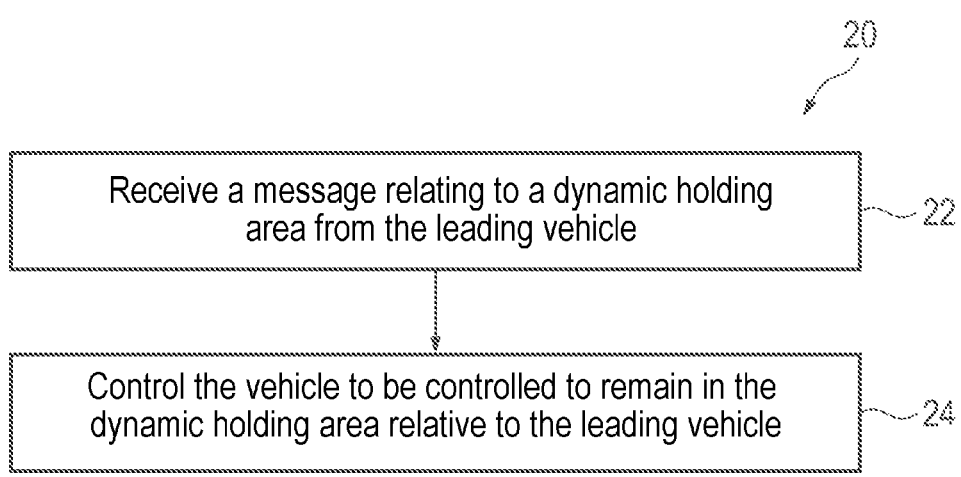
FIG. 2 shows a block diagram of a flowchart of an exemplary embodiment of a method for a transportation vehicle to be controlled and for taking over control by a leading transportation vehicle.

FIG. 2 illustrates a block diagram of a flowchart of an exemplary embodiment of a method 20 for a transportation vehicle to be controlled and for taking over control by a leading transportation vehicle. The method 20 comprises receiving 22 a message relating to a dynamic holding area from the leading transportation vehicle and controlling 24 the transportation vehicle to be controlled to remain in the dynamic holding area relative to the leading transportation vehicle. In this case, the control 24 can be carried out by various possible entities. For example, a driver of the transportation vehicle to be controlled receives the message and information relating to the holding area. The driver controls the transportation vehicle from then on in such a manner that it remains in the holding area. The driver can actually be in the transportation vehicle or in a teleoperations center for remotely controlling the transportation vehicle. Other facets comprise the autonomous or partially autonomous control of the controlled transportation vehicle, with the result that it remains in the holding area.

To prevent misuse and ensure an authorized process, a control center may be involved at least in some exemplary embodiments. The control center then forms a type of monitoring center, with respect to which the leading transportation vehicle is authorized before taking over control. The method 10 for the leading transportation vehicle can then comprise transmitting an item of information relating to the takeover of control to a control center and receiving a confirmation of the takeover of control from the control center. The method 20 for the transportation vehicle to be controlled can accordingly comprise receiving an authorization from a control center relating to the takeover of control before controlling 24 the transportation vehicle to be controlled.

Figure 3:
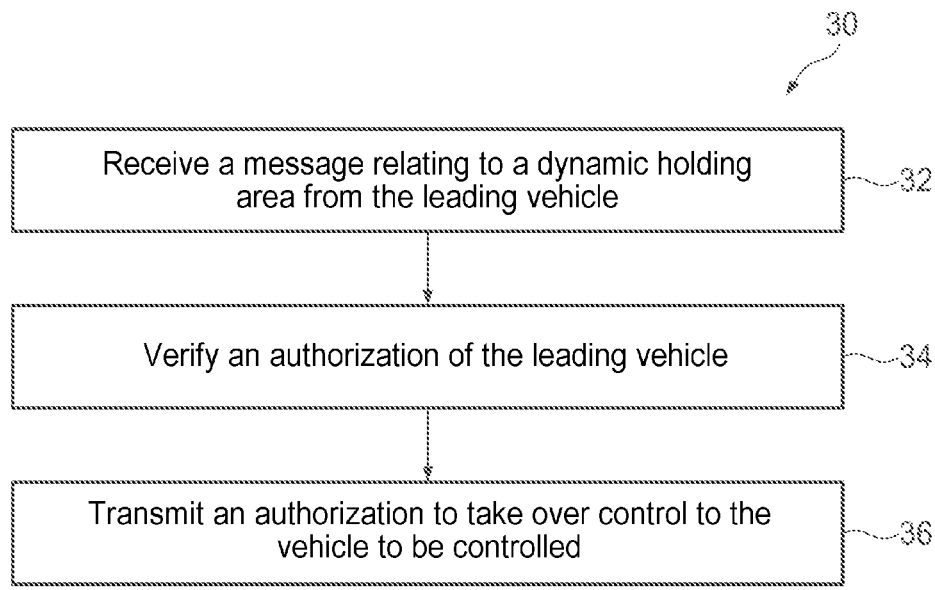
FIG. 3 shows a block diagram of a flowchart of an exemplary embodiment of a method for a control center for monitoring a takeover of control of a transportation vehicle to be controlled by a leading transportation vehicle.

FIG. 3 shows a block diagram of a flowchart of an exemplary embodiment of a method 30 for a control center for monitoring a takeover of control of a transportation vehicle to be controlled by a leading transportation vehicle. The method 30 comprises receiving 32 a message relating to a dynamic holding area from the leading transportation vehicle and verifying 34 an authorization of the leading transportation vehicle. The method 30 also comprises transmitting 36 an authorization to take over control to the transportation vehicle to be controlled. In this case, the authorization can be verified 34 using common methods by appropriate signatures, certificates or key pairs, thus ensuring that the leading transportation vehicle and the controlled transportation vehicle are authorized and identified.

In some further exemplary embodiments, it is also possible to document the takeover of control. The method 10 then comprises documenting the takeover of control in the leading transportation vehicle. The method 20 may comprise documenting the takeover of control in the transportation vehicle to be controlled. Finally, the method 30 may comprise documenting the takeover of control by the control center. In this case, comprehensibility of the takeover of control can be ensured. For example, DLT (Distributed Ledger Technology), for example, a blockchain, can be used for this purpose. In this case, all involved parties (leading transportation vehicle, controlled transportation vehicle and/or control center) can digitally verify and confirm the operation, with the result that manipulations are also subsequently excluded.

In exemplary embodiments, the operation of controlling 24 the transportation vehicle to be controlled to remain the dynamic holding area relative to the leading transportation vehicle can also be carried out on the basis of received traffic information. A particular traffic situation may cause control from the holding area. In some exemplary embodiments, the controlled transportation vehicle is therefore forced into the specified holding area only in a certain framework, wherein the framework allows exceptions. Such an exception may be, for example, a traffic event which occurs suddenly, such as an accident or a transportation vehicle cutting in. Such information can be transmitted as messages, detected by sensors or perceived by a driver of the controlled transportation vehicle.

In further exemplary embodiments, the method 20 may also comprise taking over control of a transportation vehicle following the transportation vehicle to be controlled. In some exemplary embodiments, transportation vehicle chains (platoons or convoys) can therefore be formed, wherein a subsequent transportation vehicle is respectively in a dynamic holding area of a transportation vehicle driving in front. In this case, control of a transportation vehicle leading the transportation vehicle chain can be centrally taken over or organized in a distributed manner, for example, in such a manner that a transportation vehicle driving in front respectively controls its successor.

Figure 4:
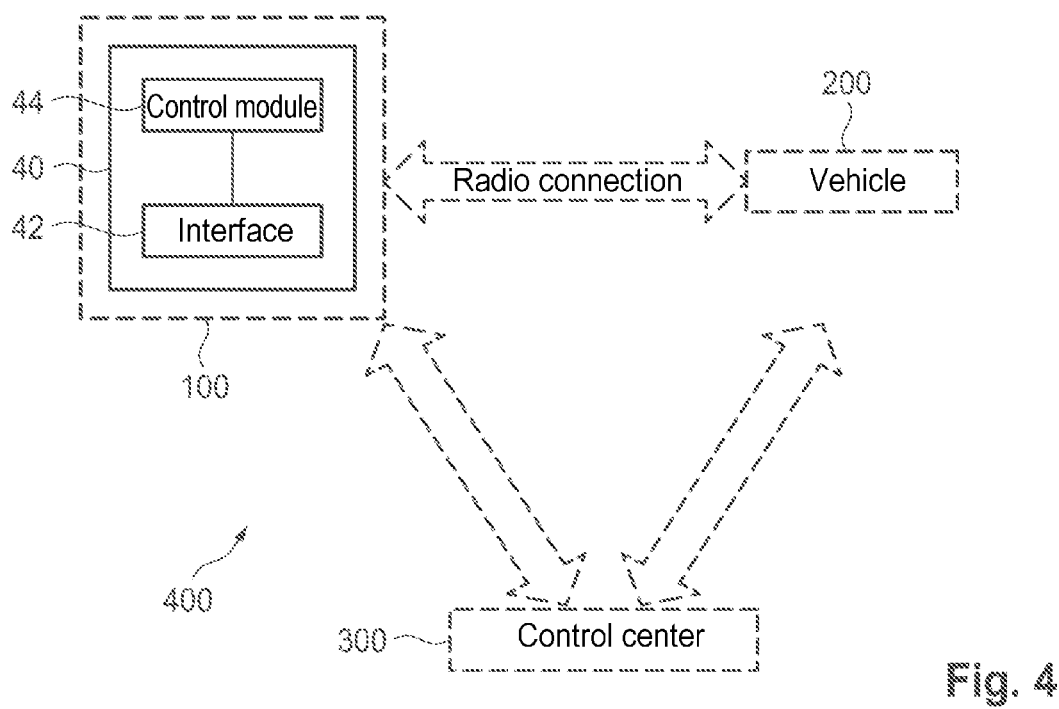
FIG. 4 shows a block diagram of an exemplary embodiment of a leading transportation vehicle, an exemplary embodiment of a transportation vehicle to be controlled, an exemplary embodiment of a control center and an exemplary embodiment of an apparatus for coordinating a takeover of control of a transportation vehicle to be controlled by a leading transportation vehicle.

FIG. 4 shows a block diagram of an exemplary embodiment of a transportation vehicle 100 and an exemplary embodiment of an apparatus 40 for coordinating a takeover of control of a transportation vehicle 200 to be controlled by a leading transportation vehicle 100. The apparatus 40 for coordinating the takeover of control of the transportation vehicle 200 to be controlled by the leading transportation vehicle 100 comprises at least one interface 42 for communication, for example, with the transportation vehicle 200 to be controlled or with a control center 300. The apparatus 40 also comprises a control module 44 which is coupled to the at least one interface 42 and is designed to control the latter. The control module 44 is also designed to carry out one of the methods 10, 20 and/or 30. In FIG. 4, the apparatus 40 is integrated in the leading transportation vehicle 100 for carrying out the method 10, which is illustrated using dashed lines since it is optional from the point of view of the apparatus 40. The transportation vehicle 100 therefore forms a further exemplary embodiment. Further exemplary embodiments are a transportation vehicle 200 to be controlled having an apparatus 40 for carrying out the method 20 and a control center 300 having an apparatus 40 for carrying out the method 30.

The leading transportation vehicle 100 and the transportation vehicle 200 to be controlled and optionally the control center may be parts of a communication system 400 in which communication is carried out via the respective interfaces 42.

The at least one interface 42 of the apparatus 40 may be contacts of the control module 44 in exemplary embodiments. It may also be separate hardware in exemplary embodiments. It may comprise memories which at least temporarily store the signals to be transmitted and the received signals. The at least one interface 42 may be designed to receive electrical signals, for example, a bus interface or an optical interface. It may also be designed for radio transmission in exemplary embodiments and may comprise a radio front-end and associated antennas. The at least one interface 42 may also comprise synchronization mechanisms for synchronizing with the respective transmission medium, for example, for the CAN bus (CAN:=Controller Area Network). In exemplary embodiments, the at least one interface 42 may be designed to communicate in the transportation vehicle and/or in other transportation vehicles or entities via a network 400, for example.

In exemplary embodiments, the control module 44 may be hardware which is designed to carry out one of the methods described herein. These may be any desired processor cores such as digital signal processor cores (DSPs) or other processors. In this case, exemplary embodiments are not restricted to a particular type of processor core. Any desired processor cores or a plurality of processor cores or microcontrollers are conceivable for implementing the control module 44. Implementations in an integrated form with other apparatuses are also conceivable, for example, in a control unit for a transportation vehicle that additionally comprises one or more other functions. In exemplary embodiments, the control module may be implemented by a processor core, a computer processor core (CPU=central processing unit), a graphics processor core (GPU=graphics processing unit), an application-specific integrated circuit core (ASIC), an integrated circuit (IC), a system-on-chip core (SOC), a programmable logic element or a field programmable gate array (FPGA) with a microprocessor as the core of the above-mentioned module(s). The control module can therefore correspond to any component which can calculate or determine a traffic density from the movement profile.

Data/information communicated between transportation vehicles 100, 200 or between transportation vehicles and transmitters installed in a stationary manner on infrastructure objects 300 can be communicated via radio, for example. Such information can be referred to as vehicle-to-vehicle data (V2V) or vehicle-to-infrastructure data (V2I) or generally as vehicle-to-everything data (V2X).

The apparatuses 40, the control center 300 and the transportation vehicles 100, 200 can communicate via a mobile communication system 400. The mobile communication system 400, as shown in FIG. 4, can, for example, to a mobile communication system which is or has been standardized by 3GPP (3rd Generation Partnership Project), wherein the term "mobile communication system" is used synonymously with mobile communication network. The messages (requests, approvals, control information, information relating to the holding area) can therefore be transmitted via a plurality of network nodes (for example, Internet, routers, switches etc.) and the mobile communication system 400.

The mobile or wireless communication system 400 may correspond to a fifth generation mobile communication system (5G or New Radio) and can use mm wave technology. The mobile communication system may correspond to or comprise, for example, an LTE (long term evolution) system, an LTE-Advanced (LTE-A) system, high-speed packet access (HSPA), a universal mobile telecommunication system (UMTS) or a UMTS terrestrial radio access network (UTRAN), an evolved UTRAN (e-UTRAN), a global system for mobile communication (GSM) or enhanced data rates for GSM evolution (EDGE), a GSM/EDGE radio access network (GERAN) or mobile communication networks with different standards, for example, a WiMAX network (worldwide interoperability for microwave access) IEEE 802.16 or WLAN 802.11 (wireless local area network), generally an OFDMA network (orthogonal frequency division multiple access), a TDMA network (time division multiple access), a CDMA network (code division multiple access), a WCDMA network (wideband-CDMA), an FDMA network (frequency division multiple access), an SDMA network (spatial division multiple access) etc.

In exemplary embodiments, the control can be carried out according to the instructions from the police or the like, for example, via a control and command center belonging to the transportation vehicle, for example, to stop at the next parking lot, to stop on the hard shoulder, to take the next exit, to "follow", etc. This can presuppose that both the official transportation vehicle 100 and the autonomous transportation vehicle 200 have a connection to a backend, for example, via a cellular connection 400.

If this is not present, alternative ways can be used to maneuver the transportation vehicle from an area or into a particular area, for example, by direct communication. Even if the connection to the backend is present, an emergency transportation vehicle (for example, police) can inform the backend that the emergency transportation vehicle is taking over direct control of the transportation vehicle to be controlled. One possibility is via direct communication. Various technologies are available for this, for example, ITS-G5 (intelligent transport system), C-V2X (cellular V2X), 5G NR-V2X (5th generation, new radio), IEEE 802.11bd (Institute of Electrical and Electronics Engineers) and others.

Before a command (takeover of control), secure direct addressability must be carried out at least in some exemplary embodiments by authentication and authorization. Various methods are also known for this purpose. Certificates, key methods etc.

Target positions, maximum speeds and information relating to the dynamic holding area can then be transmitted and the transportation vehicle automatically approaches this position or the holding area using its own sensor system. If areas which have not been approved for this must be crossed, this can result in a dilemma. The trajectory is therefore specified to the remote transportation vehicles 200 by the leading emergency transportation vehicle 100 via the holding area, with the result that the remote transportation vehicles follow the same route with certain degrees of freedom. The guided transportation vehicles 200 can then also be made to stop by specifying the holding area relative to the leading transportation vehicle, for example, if the latter likewise stops.

An official transportation vehicle with direct communication may provide an electronic towing hook in this case and can assume the role of a scout transportation vehicle which drives in front and therefore defines (and possibly clears, gap formation) and approves a driving path/corridor which can be used. Depending on the situation, a transportation vehicle or an entire series of transportation vehicles (platoon formation with multiple electronic tow bar) can be removed from areas and traffic jam situations can therefore be resolved, for example. A benefit in this case may be the fact that direct communication functions everywhere. The prerequisite may be a standardized communication method at standardized frequencies.

FIG. 5 shows a scenario of taking over control in at least one exemplary embodiment. In this scenario, a leading transportation vehicle 100 takes over control of a transportation vehicle 200 to be controlled. For this purpose, a control center 300 communicates with the transportation vehicle 100 and authorizes the latter to take over control. This is communicated on to the transportation vehicle 200 by the leading transportation vehicle 100 using V2V. In exemplary embodiments, this can also be directly communicated to the transportation vehicle 200 by the control center 300. In the exemplary embodiment shown, the transportation vehicle 100 now transmits a message containing information relating to the dynamic holding area to the transportation vehicle 200. In this case, the holding area is defined in such a manner that the transportation vehicle 200 remains behind the transportation vehicle 100 but can use a different lane. FIG. 5 shows an overtaking operation in which the transportation vehicle 100 has changed to the right-hand lane again after overtaking a transportation vehicle 500 and the controlled transportation vehicle 200 follows it, but is initially still in the left-hand lane.

Exemplary embodiments can also be or relate to a computer program having a program code for carrying out one or more of the above methods when the computer program is executed on a computer or processor. Operations or processes of different methods described above can be carried out by programmed computers or processors. Examples may also cover program storage apparatuses, for example, digital data storage media, which are machine-readable, processor-readable or computer-readable and code machine-executable, processor-executable or computer-executable programs of instructions. The instructions carry out some or all of the operations of the methods described above or cause them to be carried out. The program storage apparatuses may comprise or be, for example, digital memories, magnetic storage media, for example, magnetic disks and magnetic tapes, hard disk drives or optically readable digital data storage media. Further examples may also cover computers, processors or control units which are programmed to carry out the operations of the methods described above or (field) programmable logic arrays ((F)PLAs) or (field) programmable gate arrays ((F)PGAs) which are programmed to carry out the operations of the methods described above.

Functions of different elements shown in the figures and the designated functional blocks can be implemented as dedicated hardware, for example, "a signal provider", "a signal processing unit", "a processor", "a controller" etc. and as hardware capable of executing software in conjunction with associated software. When provided by a processor, the functions can be provided by an individual dedicated processor, an individual shared processor or a plurality of individual processors, some or all of which can be shared. However, the term "processor" or "controller" is by far not limited to only hardware capable of executing software, but may comprise digital signal processor hardware (DSP hardware; DSP=digital signal processor), a network processor, an application-specific integrated circuit (ASIC), a field programmable logic array (FPGA=field programmable gate array), a read-only memory (ROM) for storing software, a random access memory (RAM) and a non-volatile storage apparatus. Other hardware, conventional and/or customer-specific, can also be included.

A block diagram can represent, for example, a rough circuit diagram which implements the principles of the disclosure. In a similar manner, a flow diagram, a flowchart, a state transition diagram, a pseudocode and the like can represent different processes, operations or operations s which are represented substantially in a computer-readable medium, for example, and are thus carried out by a computer or processor irrespective of whether such a computer or processor is explicitly shown. Methods disclosed in the description or in the patent claims can be implemented by a component which has a method or mechanism for carrying out each of the respective operations s of these methods.

It goes without saying that the disclosure of a plurality of processes, operations or functions disclosed in the description or the claims is not intended to be interpreted as being in the specific order, unless explicitly or implicitly stated otherwise, for example, for technical reasons. Therefore, through the disclosure of a plurality of operations or functions, they are not restricted to a specific order unless these operations or functions are not interchangeable for technical reasons. Furthermore, in some examples, an individual operations, function, process or operation may include and/or be broken down into a plurality of subfunctions, subprocesses or suboperations. Such suboperations may be included and may be part of the disclosure of this individual operation unless explicitly excluded.

LIST OF REFERENCE SIGNS

10 Method for a leading transportation vehicle and for taking over control of a transportation vehicle to be controlled
12 Identify the transportation vehicle to be controlled
14 Determine a dynamic holding area relative to the leading transportation vehicle for the transportation vehicle to be controlled
16 Transmit a message relating to the dynamic holding area to the transportation vehicle to be controlled
20 Method for a transportation vehicle to be controlled and for taking over control by a leading transportation vehicle
22 Receive a message relating to a dynamic holding area from the leading transportation vehicle
24 Control the transportation vehicle to be controlled to remain in the dynamic holding area relative to the leading transportation vehicle
30 Method for a control center for monitoring a takeover of control of a transportation vehicle to be controlled by a leading transportation vehicle
32 Receive a message relating to a dynamic holding area from the leading transportation vehicle
34 Verify an authorization of the leading transportation vehicle
36 Transmit an authorization to take over control to the transportation vehicle to be controlled
40 Apparatus for coordinating a takeover of control of a transportation vehicle to be controlled by a leading transportation vehicle
42 At least one interface
44 Control module
100 Transportation vehicle
200 Transportation vehicle
300 Transportation vehicle
400 Communication system
500 Transportation vehicle

The invention claimed is:

1. An apparatus for coordinating and documenting a controlled takeover of a transportation vehicle to be controlled by a leading transportation vehicle, the apparatus comprising:
   at least one interface for communication with the transportation vehicle to be controlled; and
   a control module configured to:
      identify the transportation vehicle to be controlled during operation of the transportation vehicle on a road;
      determine a dynamic holding area relative to the leading transportation vehicle for the transportation vehicle to be controlled, wherein the dynamic holding area is defined so that the transportation vehicle to be controlled remains behind the leading transportation vehicle;
      transmit a message specifying details regarding definition of the dynamic holding area to the transportation vehicle to be controlled; and
      document the takeover of control by the leading transportation vehicle, whereby the documentation provides a distributed ledger technology that documents digital verification and confirmation of the transfer of control of the controlled transportation vehicle operation to the leading transportation vehicle, by all involved parties including the transportation vehicle to be controlled, the leading transportation vehicle, and the apparatus.

2. The apparatus of claim 1, wherein the dynamic holding area comprises a corridor behind the leading transportation vehicle for the transportation vehicle to be controlled.

3. The apparatus of claim 1, wherein the control module is further configured to transmit an item of information relating to the takeover of control, the item of information being transmitted to a control center and to receive confirmation of the takeover of control of the transportation vehicle from the control center.

4. The apparatus of claim 1, wherein the dynamic holding area is based on the speed of the leading transportation vehicle and a traffic situation.

5. A transportation vehicle comprising the apparatus of claim 1.

6. A method for a leading transportation vehicle taking over control of a transportation vehicle to be controlled and documenting the taking over of control, the method comprising:
   identifying the transportation vehicle to be controlled during operation of the transportation vehicle on a road;
   determining a dynamic holding area relative to the leading transportation vehicle for the transportation vehicle to be controlled, wherein the dynamic holding area is defined so that the transportation vehicle to be controlled remains behind the leading transportation vehicle;
   transmitting a message specifying details regarding definition of the dynamic holding area to the transportation vehicle to be controlled; and
      documenting the takeover of control in the leading transportation vehicle, whereby the documentation provides a distributed ledger technology that documents digital verification and confirmation of the transfer of control of the controlled transportation vehicle operation to the leading transportation vehicle, by all involved parties including the transportation vehicle to be controlled, the leading transportation vehicle, and an apparatus or control center.

7. The method of claim 6, wherein the dynamic holding area comprises a corridor behind the leading transportation vehicle for the transportation vehicle to be controlled.

8. The method of claim 6, wherein the dynamic holding area is based on the speed of the leading transportation vehicle and a traffic situation.

9. A method for a transportation vehicle to be controlled for taking over control by a leading transportation vehicle during operation of the transportation vehicle on a road and documenting the taking over of control, the method comprising:
   receiving a message specifying details regarding definition of a dynamic holding area from the leading transportation vehicle, wherein the dynamic holding area is defined so that the transportation vehicle to be controlled remains behind the leading transportation vehicle;
   controlling the transportation vehicle to be controlled to remain in the dynamic holding area relative to the leading transportation vehicle; and
      documenting the takeover of control in the transportation vehicle to be controlled, whereby the documentation provides a distributed ledger technology that documents digital verification and confirmation of the transfer of control of the controlled transportation vehicle operation to the leading transportation vehicle, by all involved parties including the transportation vehicle to be controlled, the leading transportation vehicle, and the apparatus.

10. The method of claim 9, further comprising receiving an authorization from a control center relating to the takeover of control before controlling the transportation vehicle to be controlled.

11. The method of claim 9, wherein the operation of controlling the transportation vehicle to be controlled to remain in the dynamic holding area relative to the leading transportation vehicle is performed based on received traffic information, and wherein a particular traffic situation causes control from the dynamic holding area.

12. The method of claim 9, further comprising taking over control of a transportation vehicle following the transportation vehicle to be controlled.

13. A method for a control center for monitoring a takeover of control of a transportation vehicle to be controlled by a leading transportation vehicle and documenting the taking over of control, the method comprising:
   receiving a message specifying details regarding definition of a dynamic holding area from the leading transportation vehicle, wherein the dynamic holding area is defined so that the transportation vehicle to be controlled remains behind the leading transportation vehicle;
   verifying an authorization of the leading transportation vehicle;
   transmitting an authorization to take over control to the transportation vehicle to be controlled during operation of the transportation vehicle on a road; and
      documenting the takeover of control, whereby the documentation provides a distributed ledger technology that documents digital verification and confirmation of the transfer of control of the controlled transportation vehicle operation to the leading transportation vehicle, by all involved parties including the transportation vehicle to be controlled, the leading transportation vehicle, and the control center.

14. A non-transitory computer readable medium including a computer program comprising program code for carrying out the method of claim 3 when the program code is executed on a computer, a processor, a control module or a programmable hardware component.

15. A non-transitory computer readable medium including a computer program comprising program code for carrying out the method of claim 7 when the program code is executed on a computer, a processor, a control module or a programmable hardware component.

16. A non-transitory computer readable medium including a computer program comprising program code for carrying out the method of claim 10 when the program code is executed on a computer, a processor, a control module or a programmable hardware component.

17. The apparatus of claim 1, wherein the dynamic holding area is defined so that the transportation vehicle to be controlled remains behind the leading transportation vehicle and uses a different lane.

18. The method of claim 6, wherein the dynamic holding area is defined so that the transportation vehicle to be controlled remains behind the leading transportation vehicle and uses a different lane.

19. The method of claim 9, wherein the dynamic holding area is defined so that the transportation vehicle to be controlled remains behind the leading transportation vehicle and uses a different lane.

20. The method of claim 13, wherein the dynamic holding area is defined so that the transportation vehicle to be controlled remains behind the leading transportation vehicle and uses a different lane.

\* \* \* \* \*